United States Patent [19]

Bartlett

[11] 4,182,687
[45] Jan. 8, 1980

[54] LIQUID-WATER DISPLACEMENT COMPOSITION

[75] Inventor: Philip L. Bartlett, Wilmington, Del.

[73] Assignee: E. I. Du Pont de Nemours and Company, Wilmington, Del.

[21] Appl. No.: 858,662

[22] Filed: Dec. 8, 1977

[51] Int. Cl.$^2$ .............................................. C09K 3/18
[52] U.S. Cl. .................................. 252/194; 252/153; 252/545; 252/DIG. 17
[58] Field of Search ............. 252/545, 547, 153, 89 R, 252/DIG. 17, 194

[56] References Cited

U.S. PATENT DOCUMENTS

| | | | |
|---|---|---|---|
| 3,314,892 | 4/1967 | Graham | 252/153 |
| 3,386,181 | 6/1968 | Steinacker | 34/9 |
| 3,397,150 | 8/1968 | Burt et al. | 252/364 X |
| 3,503,890 | 3/1970 | Davisson et al. | 252/547 X |
| 3,903,012 | 9/1975 | Brandreth | 252/171 X |
| 3,962,798 | 6/1976 | Jackson | 34/9 |

FOREIGN PATENT DOCUMENTS

| | | | |
|---|---|---|---|
| 49-55583 | 5/1974 | Japan | 252/194 |
| 835072 | 5/1960 | United Kingdom | 34/9 |

Primary Examiner—Richard D. Lovering

[57] ABSTRACT

Liquid-water displacement composition consisting essentially of a normally liquid chlorofluorocarbon having at least two carbon atoms, a boiling point of at least about 28° C., a density of at least about 1.3 grams/cc at 20° C. and a solubility parameter of less than about 8 and such an amount of surfactant dissolved therein as to impart water displacement characteristics to the composition, said surfactant being soluble in a water displacing amount in said normally liquid chlorofluorocarbon and being a tetraalkyl ammonium compound having a water extractability from the composition of not more than 30 weight %, preferably not more than 10 weight %, most preferably not more than 5 weight %, the cationic moiety of the surfactant being of the formula $$R_m N^{\oplus} R_n'$$

wherein
m is 2 or 3,
n is 1 or 2,
the sum of m and n is 4,
R is $C_{6-18}$ alkyl and
R' is $C_{1-2}$ alkyl, said composition having an aqueous emulsion separation time of not more than 8 minutes, preferably not more than 5 minutes, and being able to dry a standard lead frame for electronic applications to a moisture level of not more than 8.5 weight %.

5 Claims, No Drawings

LIQUID-WATER DISPLACEMENT COMPOSITION

BACKGROUND OF THE INVENTION

1. Field of the Invention

This invention relates to a composition which is useful for displacing liquid water from the surfaces of articles.

2. Description of the Prior Art

In many machining and cleaning operations, metal parts are brought into contact with water, with the result that the finished metal surface remains wet. As is well known, water leads to more rapid corrosion of these metal surfaces. Many machined metal parts, such as bearings and precision valve components, cannot tolerate corrosion because of the fine tolerances usually required. In addition, certain metal parts, and particularly precision metal parts, must be completely dry before they are assembled. Ball, needle and roller bearings, for example, if inserted in a race while wet will corrode and freeze the bearing assembly. Accordingly, it is necessary that many metal parts be completely dried immediately after the machining or cleaning operation, and before they are assembled. A similar need exists for drying plastic and glass surfaces, particularly when these parts are to be used in combination with metal parts.

Heretofore, such parts have been dried by simple heating, but this is often undesirable since heating in the presence of water may cause corrosion. Moreover, heating requires handling which is also undesirable. Water has also been removed by treating with certain solvents such as acetone or alcohol. However, such liquids are toxic and flammable, and thus present operational hazards. Accordingly, a need exists for a method of removing water from surfaces without heating in the presence of water or using flammable or toxic solvents.

As is well known, ferrous metal surfaces will rust, particularly if the surface is free of protective materials. Degreased metals are particularly prone to rusting since the surface is completely free of materials which would otherwise prevent contact of the surface with oxygen.

Rusting of many surfaces, while undesirable, is not particularly serious, providing the rust is removed before further treating such as painting, plating or the like. However, the slightest amount of rusting of the surface of precision ferrous metal parts, for example, ball bearings and the like, is a serious matter since such parts are machined and finished to very fine tolerances. Many methods have been developed for treating ferrous metal surfaces to prevent rusting. Because none of these methods is 100% effective in all cases, there is a continuing need for improved methods of rust prevention.

The removal of liquid water from the surfaces of articles by means of organic water-immiscible liquids is well known. As evidence of the state of the art is U.S. Pat. No. 3,903,012 wherein is disclosed a liquid-water displacement composition comprised of a surfactant dissolved in a fluorine-containing compound having a solubility parameter of less than about 8, a density of at least about 1.3 grams/cubic centimeter at room temperature and a boiling point above about 20° C., said composition having an interfacial tension with water of up to about 6 dynes/centimeter and a water-solubilizing capability of less than about 750 parts/million. Additional evidence as to the state of the art in the field of liquid-water displacement compositions may be found in the background section of the above patent.

Although water displacement compositions comprising a surfactant and a normally liquid organic solvent are well known, their usefulness may be impaired by a tendency of such a composition to form an emulsion when admixed with water. This characteristic is particularly detrimental to the composition if the emulsion is difficultly or only very slowly separable into two phases. It is suggested in the aforesaid U.S. Pat. No. 3,903,012 that a small amount of a $C_{1-6}$ mono-alcohol may be added either to prevent the formation of such an emulsion or to hasten separation of the two phases.

Other examples of prior art in the field of liquid-water displacement compositions, processes and apparatus include U.S. Pat. No. 3,386,181 and U.S. Pat. No. 3,397,150. In the former are disclosed a process and apparatus for removing water from the surfaces of non-absorbent articles. In carrying out the process the articles are immersed in a bath having both a turbulent region and a quiescent region, the bath containing as its principal component a water-immiscible solvent which has a boiling point of about 20°–60° C. and a density of at least about 1.1 at 20° C. and does not form an azeotrope containing more than about 4% of water or boiling more than 8° C. below the boiling point of the water-immiscible solvent. In U.S. Pat. No. 3,397,150 is disclosed a process for removing water from solid surfaces by treating the surfaces with a composition containing trichlorotrifluoroethane and a solute derived from a mono- or di-$(C_{6-20}$ alkyl) phosphate ester and a saturated aliphatic amine having 1–3 alkyl groups attached to the nitrogen atom and a total of 6–20 carbon atoms, for example, 2-ethylhexylammonium octyl phosphate.

SUMMARY OF THE INVENTION

It is an object of this invention to provide a highly effective liquid-water displacement composition which does not require the addition of a mono-alcohol to prevent the formation of a water-oil emulsion or to hasten separation of the phases therefrom, if formed. It is a further object to provide such a composition which, when emulsified with water, rapidly separates into two phases, that is, the oil phase and the aqueous phase, thus permitting rapid recycling of the composition. Another object is to provide such a composition which exhibits improved (over the prior art) resistance to extraction by water. Other objects will become apparent hereinafter.

In summary, the invention resides in a liquid-water displacement composition consisting essentially of a normally liquid chlorofluorocarbon having at least two carbon atoms, a boiling point of at least about 28° C., a density of at least about 1.3 grams/cc at 20° C. and a solubility parameter of less than about 8 and such an amount of surfactant dissolved therein as to impart water displacement characteristics to the composition, said surfactant being soluble in a water displacing amount in said normally liquid chlorofluorocarbon and being a tetraalkyl ammonium compound having a water extractability from the composition of not more than 30 weight %, the cationic moiety of the surfactant being of the formula

wherein
m is 2 or 3,
n is 1 or 2, the sum of m and n is 4,

R is $C_{6-18}$ alkyl and

R' is $C_{1-2}$ alkyl, said composition having an aqueous emulsion separation time of not more than 8 minutes and being able to dry a standard lead frame for electronic applications to a moisture level of not more than 8.5 weight %. By "normally liquid chlorofluorocarbon" is meant a chlorofluorocarbon that is liquid at ambient conditions of about 20° to 25° C. and one atmosphere of pressure. By "consisting essentially of . . . " is meant that the two components, that is, the chlorofluorocarbon and the surfactant, are essential to the invention. However, it is not intended to preclude the presence of other materials which do not substantially alter the inventive features of the liquid-water displacement composition.

DETAILED DESCRIPTION OF THE INVENTION

The invention resides in a composition which is particularly useful for displacement drying, that is, removing by displacement, liquid water from the surfaces of solid articles by contacting such surfaces, which are wet by and/or coated with liquid water, with the composition of this invention for sufficient time to remove water from the surfaces. This type of operation to remove liquid water from solid article surfaces is referred to in the art as displacement drying. Such a procedure is also referred to herein as drying. The contacting of the surfaces with the water displacement composition of this invention can be effected by spraying, brushing or otherwise applying the composition to or passing the composition over the surfaces, or by immersing the article in the composition. When immersion techniques are employed, the composition may be appropriately agitated.

Liquid-water removal is preferably carried out at ambient temperatures, although lower temperatures (above the freezing point of water) or higher temperatures (up to the boiling point of the composition and/or at which water is still in the liquid state) can be used. In closed systems temperatures above the atmospheric pressure boiling point of the composition can be used, although no special advantage is gained thereby. The time of treatment is not unduly critical since a substantial amount of liquid water is removed from the surfaces upon initial contact of the composition with the surfaces. As a practical matter the surfaces to be dried usually should be in contact with the composition for about one minute, although longer or shorter times can be employed depending on the particular circumstances of the drying operation. If desired the solid article, after drying, can be rinsed with fresh normally liquid chlorofluorocarbon (of the invention composition) and/or another nonaqueous, relatively inert (to the surfaces) material to remove any surfactant remaining on the surfaces. Finally, the liquid chlorofluorocarbon, if desired, can be removed from the surfaces by conventional techniques, such as by evaporation.

As disclosed hereinabove, one essential component of the invention composition, the major essential component, is a normally liquid chlorofluorocarbon having at least two carbon atoms, a boiling point of at least about 28° C., a density of at least about 1.3 grams/cc at 20° C. and a solubility parameter of less than about 8. Such materials are well known to one of ordinary skill in the art and are commonly available.

The solubility parameter of a liquid chlorofluorocarbon can be calculated from the equation $$\delta = \left[ \frac{\Delta H - RT}{V} \right]^{\frac{1}{2}}$$

where $\delta$ is the solubility parameter, in the units of (calories/cc.)$^{\frac{1}{2}}$, $\Delta H$ is the heat of vaporization per mole, R is the gas constant, T is the absolute temperature and V is the volume per mole, all in consistent units. $\Delta H$, if not already known, is readily determined by standard methods. V, if not known, is easily calculated from the density of the compound by dividing it into the molecular weight. The solubility parameter is a constant which characterizes each material; it is often known as the Hildebrand solubility parameter. The theory underlying the solubility parameter is that solvents tend to dissolve substances with similar solubility parameters but not substances with widely different solubility parameters. The use of solubility parameters is well known, as exemplified by Burrell, Official Digest, Federation of Paint and Varnish Production Clubs ODFPA, 27, 726 (1958) and Burrell et al., Polymer Handbook, Brandrup et al., editors, John Wiley and Sons, New York, NY, 1966 (IV), page 341. Preferred herein as the liquid chlorofluorocarbon is 1,1-dichloro-2,2,2-trifluoroethane (F-123), 1,2-dichloro-1,1-difluoroethane (F-132b) or 1,1,2-trichloro-1,2,2-trifluoroethane (F-113).

The amount of surfactant dissolved in the chlorofluorocarbon is such as to impart water displacement characteristics to the composition. As such, therefore, the surfactant must be soluble in a water displacing amount in the normally liquid chlorofluorocarbon. In general, this amount will be such as to provide an interfacial tension versus water, for the invention composition, of not greater than 7 dynes/cm. The preferred composition contains 0.1 to 2.5 grams of surfactant per liter of the composition.

The surfactant, as defined above by formula, must include in the cationic moiety four alkyl groups, of which two or three are alkyl groups of 6 to 18 carbon atoms and the remainder, that is, one or two, are alkyl groups of 1 to 2 carbon atoms. Thus, in the formula definition m is 2 or 3 and n is 1 or 2, with the sum of m and n being 4. A wide variety of anions can be employed as the anionic moiety of the surfactant. However, it has been discovered that a correlation exists between the size of the anionic moiety and the values of m and n. When the anionic moiety is relatively small, for example, an acetate, methyl sulfate, methyl phosphate, chloride or nitrite moiety, m is 3. If the anionic moiety is relatively large, for example, a relatively large alkyl phosphate anion, m can be 2 or 3. As will be apparent hereinafter, further correlations exist between the value of m and the size of relatively large anions.

It will be appreciated that, from a practical point of view, considering the leveling effect of water on the hydrolytic stability of anions, the anion will be such that the p$K_a$ of its conjugate acid will be 14 or less. The anion can be inorganic or organic provided the surfactant is soluble in the chlorofluorocarbon in a water-displacing amount, is distributed substantially in the chlorofluorocarbon (rather than in the water) so as to provide high resistance to extraction by water and is substantially nonemulsifying when the water-displacement composition is in contact with water.

Preferred surfactants herein include those wherein the anionic moiety has a molecular weight of not greater than 750 and a $pK_a$, as it conjugate acid, of not greater than 6 and wherein the anionic moiety is a halide, especially a chloride, or an organic oxyanion having a molecular weight of 125–650. Preferred among the latter group are those wherein the anion is selected from the group consisting of:

(a)

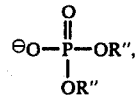

and mixtures thereof with

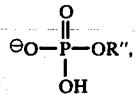

in proportions of 60/40–40/60 by weight, and wherein R" is $C_{1-18}$ alkyl when m is 3 and $C_{8-18}$ alkyl when m is 2;

(b)

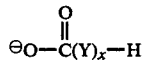

wherein x is 0 or 1 and Y is an aliphatic hydrocarbyl diradical of 1–17 carbon atoms when m is 3 and 7–17 carbon atoms when m is 2;

(c)

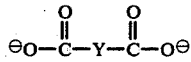

wherein Y is an aliphatic hydrocarbyl diradical of 14–36 carbon atoms when m is 3 and 14–36 carbon atoms when m is 2;

(d)

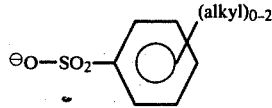

of 6–18 carbon atoms;

(e) $\ominus O\!-\!SO_2\!-\!$alkyl of 1–24 carbon atoms when m is 3 and 1–18 carbon atoms when m is 2;

(f) $\ominus O\!-\!SO_2\!-\!O$-alkyl of 1–18 carbon atoms when m is 3 and 8–18 carbon atoms when m is 2; and (g)

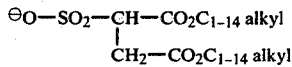

except that when m is 2, the two alkyl groups together contain at least about 6 carbon atoms.

In the case of

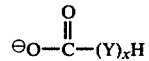

noted above, the carboxylate can range from small, for example, formate, acetate or other lower fatty carboxylate, to large, for example, long chain fatty carboxylate having up to about 18 carbon atoms. One convenient source of the anion is tall oil fatty acid derived from tall oil. Readily available tall oil fatty acids include those of the composition having, on a weight % basis, the following mixture of acids: 0.1–5.3% palmitic, 0.1.2.1% palmitoleic, 2.1–2.6% stearic, 39.3–49.5% oleic, 38.1–41.4% linoleic, 1.2–1.9% eicosanoic, 0.5.3.2% eicosadienoic, 0.4–2.9% eicosatrienoic, 0.4–0.9% behenic, and the balance, to 100 weight %, rosin acids, unidentified acids and unsaponifiable materials.

Other preferred surfactants include those wherein m is 3, the anion is acetate or chloride and R is $C_{6-10}$ alkyl and wherein m is 2, the anion is a mixed phosphate ester, for example, of the above formula wherein R" is derived from an oxo alcohol, such as a $C_8$ alkyl or $C_{13}$ alkyl oxo alcohol, and R is $C_{12-18}$ alkyl. In the aforesaid recitations wherein R is $C_{6-18}$ alkyl, $C_{6-10}$ alkyl and $C_{12-18}$ alkyl, it is to be understood that mixtures of such alkyl groups can be employed provided the mixture is predominantly of an alkyl group chain length of the recited range. By "predominantly" is meant that greater than 50 weight % of the mixed alkyl groups, preferably greater than 75 weight %, are within the recited chain length range. For example, in a preferred surfactant wherein R is, as recited above, $C_{12-18}$ alkyl, the actual composition of R, derived from readily available commercial sources, may be, on a weight basis, 8% $C_8$, 9% $C_{10}$, 47% $C_{12}$, 18% $C_{14}$, 8% $C_{16}$ and 10% $C_{18}$ alkyl. Coconut oil serves as another readily available source of alkyl groups (that is, R in the surfactant formula). This material commonly contains, on a weight basis, 8% $C_8$, 7% $C_{10}$, 48% $C_{12}$, 18% $C_{14}$, 8% $C_{16}$, 2% $C_{18}$, 6% $C_{18}$ (monounsaturated) and 3% $C_{18}$ (diunsaturated). One of the preferred surfactants herein is referred to as a dicocodimethyl derivative, meaning that the two R groups are derived from coconut oil, the two R' groups are methyl. Another preferred surfactant is one wherein the two R groups are dodecyl.

The composition of this invention, that is, the mixture of surfactant of given formula and the normally liquid chlorofluorocarbon, can be prepared using techniques well known in the art of water-displacement compositions. In the invention composition the chlorofluorocarbon is a solvent for the surfactant. It is to be understood that mixtures of surfactants of the aforesaid formula and/or mixtures of chlorofluorocarbons can be used in the invention composition.

The effectiveness and significance of the composition of this invention can be seen from an examination of measurable characteristics which are representative of in-use performance (utility) of the composition. Such characteristics are shown in the following examples which include data on the measurement of interfacial tension (versus water), drying of glass-metal connectors or lead frames used in electronic applications, aqueous emulsification separation and water extractability.

Interfacial tension can be measured using a variety of test methods. For example, U.S. Pat. No. 3,903,012 includes reference to the pendant drop method. Another method, which usually is much simpler to carry out, is the well known ring method, such as described in "Physical Chemistry of Surfaces," Arthur W. Anderson, Interscience Publishers, 2nd edition, 1967, page 24 et seq. and in "Surface and Colloid Science," Vol. 1, Egon Matijevic.

The standard drying test employed herein involves the use of glass-metal connectors or lead frames which are used in electronic applications. Each lead frame weighs about 0.11 g and consists of a glass cup having an inside diameter of 2 mm and a depth of 5 mm. Sealed to the center of the closed end of the cup is a metal capillary having an inside diameter or bore of 0.7 mm and a length of 13 mm. The metal capillary is fitted into the glass cup in such a way that it remains open at both ends and, thus, provides an opening at the closed end of the cup in a funnel-like arrangement. The metal employed is an alloy consisting of, on a weight basis, 54% iron, 29% nickel, 17% cobalt and trace amounts of manganese, silicon and chromium. The composition of the alloy is such that it has a coefficient of expansion very similar to that of the glass cup. A commonly available alloy which is used in the lead frames is "Kovar."

In carrying out the drying tests (reflected by the examples hereinbelow) with the invention composition 30 lead frames (weighing about 3.3 g) are placed in a wire basket and soaked in distilled water for at least two hours. The basket of lead frames is then immersed in 50 ml of boiling invention composition (but below the boiling point of water) for four minutes. The basket of lead frames is then immersed in boiling F-113 for one minute to remove the invention composition. Finally, the basket of leads is subjected to the vapors of F-113 for one minute to ensure removal of contaminants. The lead frames are then immersed in 15 ml of dry methyl alochol for 24 hours, after which the alcohol is removed and analyzed for water by the Karl Fischer titration method. An Aquatest II instrument may be employed. By employing the above procedure with the invention composition, the lead frames can be dried to a water content of equal to or less than 8.5 weight %. The preferred composition of the invention can reduce the water level to equal to or less than 3.0 weight %. The most preferred composition of the invention can reduce the water level to equal to or less than 1.0 weight %.

The usefulness of the composition of this invention may also be seen from an aqueous emulsification test which measures the length of time needed for any emulsion formed, when using the composition, to separate into two layers, that is, the aqueous phase and the oil phase. Distilled water (20 ml) and the invention composition (50 ml) are vigorously shaken in an appropriate bottle for 30 seconds. The emulsion is then allowed to separate undisturbed. With the invention composition aqueous emulsion separation times are equal to or less than 8 minutes, preferably not more than about 5 minutes.

Another test to demonstrate the usefulness of the invention composition is an extraction test which measures the ease of extractability of the surfactant from the normally liquid chlorofluorocarbon. It is desirable herein that the surfactant not be readily extractable by water from the invention composition. The invention composition (325 g; 200 ml) containing 0.5 weight % surfactant is extracted twice, for one minute each, with 20 ml of distilled water. Thirty minutes are allowed to elapse, to permit separation into two phases, before the aqueous extract is removed. The remaining invention composition is then evaporated to remove the chlorofluorocarbon. The surfactant residue is then weighed. The invention composition exhibits a water extractability of equal to or less than 30 weight %, preferably not more than 10 weight %, most preferably not more than 5 weight %.

EXAMPLES 1–41

In the 41 examples which follow, in general, Example 1 is a control (without surfactant), Examples 2–23 are representative of the invention composition, Examples 24–37 are representative of surfactant-containing compositions which, although closely related to, are outside the invention and Examples 38–41 are intended as representative of prior art compositions as follows:

Example 38: U.S. Pat. No. 3,903,012 (Item 5, Table 1)
Example 39: U.S. Pat. No. 3,238,011 (columns 1)
Example 40: U.S. Pat. No. 3,397,150 (column 3)
Example 41: combination of Examples 38 and 39.

In some instances an example may include compositions which are both within and outside the invention, as in Examples 2, 23, 30 and 36.

Table 1

| Ex. No. | Surfactant | Interfacial Tension conc'n (g/l) | (dynes/cm) | Drying conc+n (g/l) | H$_2$O remaining (Wt. %) | Emulsification conc+n (g/l) | separation time (min.) | Extraction Wt. % Extracted bottle |
|---|---|---|---|---|---|---|---|---|
| 1 | None | | | 0 | 12.6(A) | 0 | <0.5(A) | |
| | None | | | | | 0 | <0.5(B) | |
| | None | | | | | 0 | <0.5(C) | |
| | | | | 0.1 | 0.1(A) | | | |
| | | 0.1 | 2.4(A) | 0.5 | 0.1(A) | | | |
| 2 | (C$_{12}$H$_{25}$)$_2$$\overset{\oplus}{N}$(CH$_3$)$_2$ | 0.5 | 1.9,2.0(A) | 1.0 | 0.1,0.2(A) | 1.0 | 5.0(A) | 4 |
| | | 1.0 | 2.1,2.3(A) | 2.5 | 0.3(A) | 1.0 | 0.5(B) | |
| | $\overset{\ominus}{}$ O$_2$P(OH)$_{0.5}$(OC$_8$H$_{17}$)$_{1.5}$ | 2.5 | 2.1(A) | | | 1.0 | 20(C) | |
| 3 | (C$_{12}$H$_{25}$)$_2$$\overset{\oplus}{N}$(CH$_3$)$_2$ | 1.0 | 4.4(A) | 1.0 | 2.2(A) | 1.0 | 4.0(A) | 0 |
| | $\overset{\ominus}{}$ O$_2$P(OH)$_{0.5}$(OC$_{13}$H$_{27}$)$_{1.5}$ | 2.5 | 4.2(A) | 2.5 | 1.0(A) | | | |
| 4 | (C$_{12}$H$_{25}$)$_2$$\overset{\oplus}{N}$(CH$_3$)$_2$ | 1.0 | 4.9(A) | 1.0 | 1.5(A) | 1.0 | 1.5(A) | 5 |
| | $\overset{\ominus}{}$ O$_2$P(OC$_8$H$_{17}$)$_2$ | | | | | | | |
| 5 | (C$_{12}$H$_{25}$)$_2$$\overset{\oplus}{N}$(CH$_3$)$_2$ | 1.0 | 6.9(A) | 1.0 | 7.2(A) | 1.0 | 3.0(A) | 0 |
| | $\overset{\ominus}{}$ O$_3$SC$_6$H$_4$C$_{12}$H$_{25}$ | 2.5 | 6.8(A) | 2.5 | 7.5(A) | | | |
| 6 | (C$_{12}$H$_{25}$)$_2$$\overset{\oplus}{N}$(CH$_3$)$_2$ | 1.0 | 5.4(A) | 1.0 | 5.0(A) | 1.0 | 2.0(A) | 1 |
| | $\overset{\ominus}{}$ O$_3$SC$_6$H$_5$ | | | | | | | |
| 7 | (C$_{12}$H$_{25}$)$_2$$\overset{\oplus}{N}$(CH$_3$)$_2$ | 1.0 | 18.9(A) | 1.0 | 5.2(A) | 1.0 | 1.0(A) | 4 |

Table 1-continued

| Ex. No. | Surfactant | Interfacial Tension conc'n (g/l) | Interfacial Tension (dynes/cm) | Drying H$_2$O conc+n (g/l) | Drying H$_2$O remaining (Wt. %) | Emulsification separation conc+n (g/l) | Emulsification separation time (min.) | Extraction Wt. % Extracted bottle |
|---|---|---|---|---|---|---|---|---|
| | $\ominus$O$_3$SCHCO$_2$C$_8$H$_{17}$<br>  \|<br>  CH$_2$CO$_2$C$_8$H$_{17}$ | | | | | | | |
| 8 | (C$_{12}$H$_{25}$)$_2$$\overset{\oplus}{N}$(CH$_3$)$_2$<br>$\ominus$O$_4$SC$_{12}$H$_{25}$ | 0.94 | 7.0(A) | 0.94 | 3.4(A) | 0.94 | 1.5(A) | 12 |
| 9 | (C$_{12}$H$_{25}$)$_2$$\overset{\oplus}{N}$(CH$_3$)$_2$<br>$\ominus$O$_2$CC$_7$H$_{15}$ | 1.0 | 1.5(A) | 1.0 | 0.1(A) | 1.0 | 5.0(A) | 0 |
| 10 | (C$_{12}$H$_{25}$)$_2$$\overset{\oplus}{N}$(CH$_3$)$_2$<br>$\ominus$O$_2$CC$_{17}$H$_{33}$ (D) | 1.0 | 1.8(A) | 1.0 | 0.4(A) | 1.0 | 7.5(A) | 0 |
| 11 | (C$_{12}$H$_{25}$)$_2$$\overset{\oplus}{N}$(CH$_3$)$_2$<br>$\ominus$O$_3$SC$_{12}$H$_{25}$ | 1.0 | 1.5(A) | 1.0 | 0.8(A) | 1.0 | 2.0(A) | 0 |
| 12 | (C$_{18}$H$_{37}$)$_2$$\overset{\oplus}{N}$(CH$_3$)$_2$<br>$\ominus$O$_2$P(OH)$_{0.5}$(OC$_{13}$H$_{27}$)$_{1.5}$ | 1.0<br>2.5 | 5.0(A)<br>6.0(A) | 1.0<br>2.5 | 8.5(A)<br>7.8(A) | 1.0 | 3.0(A) | 0 |
| 13 | (C$_8$H$_{17}$)$_3$$\overset{\oplus}{N}$CH$_3$<br>$\ominus$O$_2$P(OH)$_{0.5}$(OC$_4$H$_9$)$_{1.5}$ | 1.0 | 3.8(A) | 1.0 | 0.1(A) | 1.0 | 0.9(A) | 0 |
| 14 | (C$_8$H$_{17}$)$_3$$\overset{\oplus}{N}$CH$_3$<br>$\ominus$O$_2$P(OH)$_{0.5}$(OCH$_3$)$_{1.5}$ | 1.0 | 3.0(A) | 1.0 | 0.3(A) | 1.0 | 1.5(A) | 4 |
| 15 | (C$_8$H$_{17}$)$_3$$\overset{\oplus}{N}$CH$_3$<br>$\ominus$O$_2$P(OH)$_{0.5}$(OC$_8$H$_{17}$)$_{1.5}$ | 1.0 | 6.5(A) | 1.0 | 0.7(A) | 1.0 | 0.8(A) | 0 |
| 16 | (C$_8$H$_{17}$)$_3$$\overset{\oplus}{N}$CH$_3$<br>$\ominus$O$_2$CC$_7$H$_{15}$ | 1.0 | 2.0(A) | 1.0 | 0.3(A) | 1.0 | 4.0(A) | 0 |
| 17 | (C$_8$H$_{17}$)$_3$$\overset{\oplus}{N}$CH$_3$<br>$\ominus$O$_2$CC$_{17}$H$_{33}$ (D) | 1.0 | 2.5(A) | 1.0 | 0.4(A) | 1.0 | 7.5(A) | 0 |
| 18 | (C$_8$H$_{17}$)$_3$$\overset{\oplus}{N}$CH$_3$<br>$\ominus$O$_3$SC$_6$H$_5$ | 1.0 | 5.1(A) | 1.0 | 4.5(A) | 1.0 | 1.0(A) | 2 |
| 19 | (C$_8$H$_{17}$)$_3$$\overset{\oplus}{N}$CH$_3$<br>$\ominus$OOCCH$_3$ | 1.0 | 2.0(A) | 1.0 | 0.1(A) | 1.0 | 2.0(A) | 5 |
| 20 | (C$_8$H$_{17}$)$_3$$\overset{\oplus}{N}$CH$_3$Cl$\ominus$ | 1.0 | 3.0(A) | 1.0 | 0.3(A) | 1 | 1.5(A) | 7 |
| 21 | (C$_8$H$_{17}$)$_3$$\overset{\oplus}{N}$CH$_3$<br>$\ominus$O$_3$SC$_{23}$H$_{47}$ | 1.0 | 3.0(A) | 1.0 | 2.0(A) | 1.0 | 6.0(A) | 0 |
| 22 | (C$_{12}$H$_{25}$)$_2$$\overset{\oplus}{N}$(CH$_3$)$_2$<br>$\ominus$[(O$_2$CC$_{17}$H$_{33}$)$_2$]$_\frac{1}{2}$ | 1.0 | 4.2(A) | 1.0 | 2.5(A) | 1.0 | 5.5(A) | 0 |
| 23 | (C$_{13}$H$_{27}$)$_3$$\overset{\oplus}{N}$CH$_3$<br>$\ominus$O$_4$SCH$_3$ | | | 1.0<br>2.5 | 9.7(A)<br>7.7(A) | 1.0 | 0.9(A) | |
| 24 | (C$_{12}$H$_{25}$)$_2$$\overset{\oplus}{N}$(CH$_3$)$_2$<br>$\ominus$O—C$_6$H$_4$—C$_9$H$_{19}$ | 1.0 | 2.3(A) | 1.0 | 1.1(A) | 1.0 | 24(A) | 14 |
| 25 | (C$_{12}$H$_{25}$)$_2$$\overset{\oplus}{N}$(CH$_3$)$_2$<br>$\ominus$[(OOCCH$_2$CH$_2$—)$_2$]$_\frac{1}{2}$ | 1.0 | 1.8(A) | 1.0 | 0.1(A) | 1.0 | 11.5(A) | 91 |
| 26 | (C$_{12}$H$_{25}$)$_2$$\overset{\oplus}{N}$(CH$_3$)$_2$<br>$\ominus$O$_2$P(OH)$_{0.5}$(OC$_4$H$_9$)$_{1.5}$ | 1.0 | 1.5(A) | 1.0 | 0.1(A) | 1.0 | >90(A) | 8 |
| 27 | (C$_{12}$H$_{25}$)$_2$$\overset{\oplus}{N}$(CH$_3$)$_2$<br>$\ominus$O$_2$P(OH)$_{0.5}$(OC$_6$H$_{13}$)$_{1.5}$ | 1.0 | 2.0(A) | 1.0 | 0.1(A) | 1.0 | 47(A) | 20 |
| 28 | (C$_{12}$H$_{25}$)$_2$$\overset{\oplus}{N}$(CH$_3$)$_2$<br>$\ominus$O$_2$P(OC$_4$H$_9$)$_2$ | 1.0 | 1.1(A) | 1.0 | 0.1(A) | 1.0 | >90(A) | 8 |
| 29 | (C$_{12}$H$_{25}$)$_2$$\overset{\oplus}{N}$(CH$_3$)$_2$<br>$\ominus$O$_3$SC$_{23}$H$_{47}$ | 1.0 | 1.8(A) | 1.0 | 1.1(A) | 1.0 | 20(A) | 13 |
| 30 | (C$_{12}$H$_{25}$)$_2$$\overset{\oplus}{N}$(CH$_3$)$_2$<br>$\ominus$O$_2$CC$_{17}$H$_{33}$ (D) | 0.5<br>1.0<br>2.5 | 1.7(A)<br>1.3(A)<br>1.4(A) | 1.0<br>2.5 | 0.1(A)<br>0.3(A) | 1.0 | 23(A)<br>75(C) | 0 |
| 31 | (C$_{12}$H$_{25}$)$_2$$\overset{\oplus}{N}$(CH$_3$)$_2$Cl$\ominus$ | 1.0<br>2.5 | 0.2(A)<br>0.1(A) | 1.0<br>2.5 | 0.3(A)<br>3.0(A) | | | 94 |

Table 1-continued

| Ex. No. | Surfactant | Interfacial Tension conc'n (g/l) | Interfacial Tension (dynes/cm) | Drying H₂O conc+n (g/l) | Drying H₂O remaining (Wt. %) | Emulsification separation conc+n (g/l) | Emulsification separation time (min.) | Extraction Wt. % Extracted bottle |
|---|---|---|---|---|---|---|---|---|
| 32 | $(C_{18}H_{37})_2\overset{\oplus}{N}(CH_3)_2$ $\ominus O_2P(OH)_{0.5}(OC_4H_9)_{1.5}$ | 1.0 | 4.0(A) | 1.0 | 0.4(A) | 1.0 | 32(A) | 15 |
| 33 | $(C_{18}H_{37})_2\overset{\oplus}{N}(CH_3)_2$ $\ominus O_2CC_{17}H_{33}$ (D) | 1.0 2.5 | 2.6(A) 2.8(A) | 1.0 2.5 | 5.9(A) 4.7(A) | 1.0 | 15(A) | 0 |
| 34 | $(C_{18}H_{37})_2\overset{\oplus}{N}(CH_3)_2Cl^{\ominus}$ | | | | | | | 55 |
| 35 | $C_{12}H_{25}\overset{\oplus}{N}(CH_3)_3$ $\ominus O_2P(OH)_{0.5}(OC_8H_{17})_{1.5}$ | | | | | | | 82 |
| 36 | $(C_{13}H_{27})_3\overset{\oplus}{N}CH_3I^{\ominus}$ | | | 1.0 2.5 | 10.3(A) 8.1(A) | 1.0 | 0.4(A) | |
| 37 | $C_{12}H_{25}\overset{\oplus}{N}(CH_3)_3Cl^{\ominus}$ | | | | | | | 100 |
| 38 | 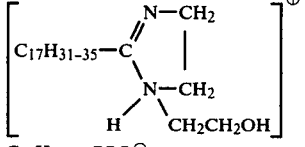 | 1.0 2.5 | 2.3(A) 2.4(A) | 1.0 2.5 | 1.0(A) 0.2(A) | 1.0 | 90(A) | 6 |
| 39 | $C_{17}H_{31-35}COO^{\ominus}$ [2 oleic acid . N,N,N,',N'-tetrakis-(2-hydroxypropyl)-ethylenediamine ester . $CH_3]^{\oplus}$ $[CH_3SO_4]^{\ominus}$ | 1.0 2.5 | 1.5(A) 2.1(A) | 1.0 2.5 | 3.2(A) 3.1(A) | | | 42 |
| 40 | 2-ethylhexylamine . (mono- and dioctyl)phosphates | 4.4 | 8.9(A) | 4.4 | 1.2(A) | 1.0 | <0.1(A) | 35 |
| 41 | mixture of Examples 38, 39 | | | | | | | 40 |

A: 1,1,2-trichloro-1,2,2-trifluoroethane
B: 1,2-dichloro-1,1-difluoroethane
C: trichlorofluoromethane
D: principal component; mixture from tall oil acids

EXAMPLE 42

Example 2 was repeated except that the surfactant was synthesized in situ according to the equation $C_8H_{17}N^{\oplus}H_3 \ominus O_2P(OH)_{0.5}(OC_8H_{17})_{1.5} +$ $(C_{12}H_{25})_2N^{\oplus}(CH_3)_2Cl^{\ominus} \rightarrow$ $(C_{12}H_{25})_2N^{\oplus}(CH_3)_2 \ominus O_2P(OH)_{0.5}(OC_8H_{17})_{1.5} +$ $C_8H_{17}^{\oplus}NH_3Cl^{\ominus}$.

10.1 Grams of the quaternary ammonium phosphate, 15.2 grams of the quaternary ammonium chloride and 60 lbs (27.2 kg) of F-113 were admixed, thus providing 17.3 grams of the surfactant of Example 2 at a concentration of 1.0 gram/liter of F-113. The invention composition so produced was employed to dry lead frames (described above) using an apparatus substantially similar to that of FIGS. 1 and 2 of U.S. Pat. No. 3,386,181. The liquid flow rate into the turbulent zone was 1.42 gallons (5.38 liters)/minute. The holdup time of lead frames was about 56 seconds. To simulate the use of liquid-water wet materials distilled water was introduced into the drying chamber at a rate of 2 liters/hour. The process was carried out continuously for more than 100 hours. Table 2 below shows the results obtained. For comparison are included the results of comparative experiments employing the surfactant of Example 2 (presynthesized) and the surfactant of Example 40 (that is, the first of the reactants in the above equation). Similarly, the results of Example 31 suggest that the above $(C_{12}H_{25})_2N(CH_3)_2Cl$, which is representative of the di-long chain alkyl dimethyl ammonium halides disclosed in U.S. Pat. No. 3,386,181, would also exhibit a relatively large degree of water extractability under the above water displacing conditions.

Table 2

| Surfactant | Surfactant Concentration (Wt. %) | Hours Run | Interfacial Tension dynes/cm | Drying (H₂O remaining, Wt. %) |
|---|---|---|---|---|
| E | 0.060 | 0 | 2.3 | 0.1 |
|  | 0.060 | 24 | — | 0.2 |
|  | 0.057 (5% loss) | 108 | 2.0 | 0.2 |
| F | 0.060 | 0 | 2.3 | 0.1 |
|  | 0.060 | 24 | — | 0.1 |
|  | 0.057 (5% loss) | 104 | 1.9 | 0.1 |
| G | 0.28 | 0 | 8.9 | 1.2 |

Table 2-continued

| Surfactant | Surfactant Concentration (Wt. %) | Hours Run | Interfacial Tension dynes/cm | Drying (H$_2$O remaining, Wt. %) |
|---|---|---|---|---|
| | 0.16 (43% loss) | 24 | 10.6 | 2.7 |

E: of Example 42
F: of Example 2
G: of Example 40

In summary, as evidenced by the above representative and comparative examples, it will be clear to one skilled in the art that the present invention depends on the cooperation of four main variables, namely, the tetraalkylammonium cation type and size, its associated anion, the carrier liquid and the concentration of the surfactant therein. It is critical that the tetraalkylammonium cation be of the type defined, containing the long chain alkyl group R and the short chain alkyl group R'. Comparision of Examples 2 and 15 of the invention with Comparative Example 35 outside the invention, all involving the same anion, shows that m must be at least 2. In other words, the long-chain alkyl trimethylammonium compounds (wherein m is 1) disclosed in U.S. Pat. No. 3,386,181 as representative of water displacing agents that can be used in the process and apparatus disclosed therein do not provide a high degree of resistance to extraction by water. Furthermore, within the above-defined classes of tetraalkylammonium compounds wherein m is 2 or 3, comparison of Examples 13 and 20 of the invention with comparative Examples 26 and 31 outside the invention shows that the anion selected for association with a particular cation depends markedly on whether m is 2 or 3. When m is 2 the associated anion must be relatively large so as to impart to the surfactant the necessary degree of resistance to extraction by water. This is exemplified further by the anions of Examples 2-12 and 22 of the invention in comparison with the anions of comparative Examples 25-28, 31, 32 and 34 involving similar cations wherein m is 2. On the other hand, the anion should not be so large that it promotes emulsification of the water displacement composition during its use. This is shown in comparison Example 11 of the invention and Example 29 outside the invention, both of which involve alkane sulfonates of different carbon contents. Still further, when m is 3 the nature of the anion is relatively unimportant. It can be inorganic, as exemplified by chloride ion in Example 20, or it can be any of a wide variety of organic anions which can vary widely in chemical constitution and size from very small (for example, methyl phosphate as in Example 14 or acetate as in Example 19) to rather large (for example, tallate as in Example 17, dimer acid carboxylate as in Example 22 or alkane sulfonate as in Example 21).

Similarly, the following combinations of Examples 5 and 6, 9 and 10, 2, 3 and 12 and 10 and 33 demonstrate that for optimum degrees of water displacement, the size of the anion and the size of the cation preferably should be correlated since, for example, the use of relatively large cations and anions may lead to less than desired degrees of water displacement. In general, the use of moderately sized cations and anions tends to enhance the water displacement characteristics of the invention composition.

The emulsification tendencies of the water displacement composition of the invention depend not only on the nature of the cation and the anion as indicated above but on the particular carrier solvent employed. This is shown by comparing the Example 2 results with the control runs of Example 1 in the same solvents, suggesting that the solvent should contain at least two carbon atoms and that hydrogen-containing members of the defined solvent class, such as F-132b and F-123, provide for more rapid separation of the two phases than do the perhalo members of the class.

Thus, it should be understood that an anion may be more suitable for the intended purpose of this invention with one particular cation within the specified limits on R, R' and m than with another of the defined cations, particularly with cations wherein m is 3, more particularly wherein R is C$_{6-10}$ alkyl and R' is methyl, in accordance with the teachings of the invention. Similarly, a particular combination of a cation and an anion, as defined, that may not be entirely satisfactory in one particular carrier solvent, as defined, may well be operable for the intended purpose of the invention in another solvent, as defined, in accordance with the teachings of the invention.

I claim:

1. Liquid-water displacement composition consisting essentially of a normally liquid chlorofluorocarbon having at least two carbon atoms, a boiling point of at least about 28° C., a density of at least about 1.3 grams/cc at 20° C. and a solubility parameter of less than about 8 and such an amount of surfactant dissolved therein as to impart water displacement characteristics to the composition, said surfactant being a tetraalkyl ammonium compound in which its cationic moiety is of the formula

wherein
m is 2,
n is 2,
R is C$_{8-18}$ alkyl and
R' is C$_{1-2}$ alkyl,
and in which the anionic moiety is a 60/40-40/60, by weight, mixture of

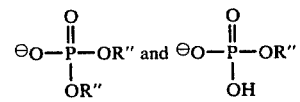

wherein R" is C$_{8-18}$ alkyl.

2. Composition of claim 1 wherein R" is a C$_8$ alkyl oxo alcohol moiety and the cationic moiety of the surfactant is didodecyldimethyl ammonium.

3. Composition of claim 1 wherein R" is a C$_8$ alkyl oxo alcohol moiety and the cationic moiety of the surfactant is dicocodimethyl ammonium.

4. Composition of claim 1 wherein R" is a C$_{13}$ alkyl oxo alcohol moiety and the cationic moiety of the surfactant is didodecyldimethyl ammonium.

5. Composition of claim 1 wherein R" is a C$_{13}$ alkyl oxo alcohol moiety and the cationic moiety of the surfactant is dicocodimethyl ammonium.

* * * * *